United States Patent
Acervo et al.

(10) Patent No.: US 11,618,380 B2
(45) Date of Patent: Apr. 4, 2023

(54) REAR PRE-CRASH SAFETY SYSTEM

(71) Applicants: Continental Automotive GmbH, Hannover (DE); Toyota Jidosha Kabushiki Kaisha, Aichi (JP)

(72) Inventors: Gladys Acervo, Kanagawa (JP); Koji Takeuchi, Aichi (JP); Junya Fukuta, Aichi (JP)

(73) Assignees: Continental Automotive GmbH, Hanover (DE); Toyota Jidosha Kabushiki Kaisha, Toyota (JP)

( * ) Notice: Subject to any disclaimer, the term of this patent is extended or adjusted under 35 U.S.C. 154(b) by 382 days.

(21) Appl. No.: 16/621,429

(22) PCT Filed: Jun. 12, 2017

(86) PCT No.: PCT/EP2017/064316
§ 371 (c)(1),
(2) Date: Dec. 11, 2019

(87) PCT Pub. No.: WO2018/228666
PCT Pub. Date: Dec. 20, 2018

(65) Prior Publication Data
US 2020/0207269 A1    Jul. 2, 2020

(51) Int. Cl.
*B60Q 9/00* (2006.01)
*G01S 7/41* (2006.01)
(Continued)

(52) U.S. Cl.
CPC ............ *B60Q 9/008* (2013.01); *B60R 19/483* (2013.01); *B60R 21/0134* (2013.01); *G01S 7/41* (2013.01);
(Continued)

(58) Field of Classification Search
CPC ..... B60R 19/483; B60R 21/0134; G01S 7/41; G01S 13/931; G01S 2013/9321; G01S 2013/93272; G08G 1/166
See application file for complete search history.

(56) References Cited

U.S. PATENT DOCUMENTS 5,646,613 A   7/1997  Cho
6,097,332 A   8/2000  Crosby, II
(Continued)

FOREIGN PATENT DOCUMENTS

CN   104515990 A   4/2015
CN   105667441 A   6/2016
(Continued)

OTHER PUBLICATIONS

Machine translation of DE102008048436 by EPO and Google, 2010.*
(Continued)

*Primary Examiner* — Yuen Wong
(74) *Attorney, Agent, or Firm* — Christensen O'Connor Johnson Kindness PLLC (57) ABSTRACT

A rear pre-crash system, RPCS, of a subject vehicle comprising a judgement logic adapted to trigger an RPCS warning signal in response to a detected radar signal reflected by a target vehicle approaching the subject vehicle from behind, wherein said judgement logic is configured to modify the triggering of the RPCS warning signal in detected specific traffic scenarios.

14 Claims, 5 Drawing Sheets

(51) Int. Cl.
  *G01S 13/931* (2020.01)
  *G08G 1/16* (2006.01)
  *B60R 19/48* (2006.01)
  *B60R 21/0134* (2006.01)

(52) U.S. Cl.
  CPC ............ *G01S 13/931* (2013.01); *G08G 1/166* (2013.01); *G01S 2013/9321* (2013.01); *G01S 2013/93272* (2020.01)

(56) References Cited

U.S. PATENT DOCUMENTS

| | | |
|---|---|---|
| 2001/0040065 A1 | 11/2001 | Takagi et al. |
| 2002/0105416 A1 | 8/2002 | Kore |
| 2003/0011507 A1 | 1/2003 | Kondo et al. |
| 2003/0227199 A1 | 12/2003 | Yoshizawa et al. |
| 2005/0273212 A1 | 12/2005 | Hougen |
| 2006/0091654 A1 | 5/2006 | De Mersseman et al. |
| 2007/0152803 A1 | 7/2007 | Huang et al. |
| 2009/0259368 A1 | 10/2009 | Hadi et al. |
| 2009/0312916 A1 | 12/2009 | Rao |
| 2010/0033365 A1 | 2/2010 | Kishida et al. |
| 2011/0035116 A1 | 2/2011 | Ieda et al. |
| 2015/0348417 A1 | 12/2015 | Ignaczak |
| 2016/0023624 A1 | 1/2016 | Schaaf |
| 2018/0154892 A1* | 6/2018 | Tamura ................. G01S 13/867 |
| 2019/0011547 A1 | 1/2019 | Han et al. |

FOREIGN PATENT DOCUMENTS

| | | | |
|---|---|---|---|
| CN | 106240458 A | 12/2016 | |
| CN | 206086597 U | 4/2017 | |
| DE | 10 2004 062 497 A1 | 7/2006 | |
| DE | 10 2005 062 274 A1 | 6/2007 | |
| DE | 10 2008 048 436 A1 | 3/2010 | |
| DE | 102008048436 A1 * | 3/2010 | ................ B60T 7/22 |
| EP | 1 332 910 A1 | 8/2003 | |
| EP | 1 345 044 A1 | 9/2003 | |
| EP | 1519203 A1 | 3/2005 | |
| JP | 2007188349 A | 7/2007 | |
| JP | 2009198402 A | 9/2009 | |
| JP | 2010038704 A | 2/2010 | |
| JP | 2011037308 A | 2/2011 | |
| JP | 2011128786 A | 6/2011 | |
| JP | 2011227587 A | 11/2011 | |
| JP | 2012052838 A | 3/2012 | |
| JP | 2012168811 A | 9/2012 | |
| JP | 2016151828 A | 8/2016 | |
| WO | 97/44216 A1 | 11/1997 | |
| WO | 99/08902 A1 | 2/1999 | |
| WO | 2007/110654 A1 | 10/2007 | |
| WO | 2009/043418 A1 | 4/2009 | |
| WO | 2009/131875 A2 | 10/2009 | |
| WO | 2016/024316 A1 | 8/2014 | |
| WO | 2016/075117 A1 | 5/2016 | |

OTHER PUBLICATIONS

Office Action dated Aug. 4, 2021 issued in Chinese Application No. 201780091990.6, 19 pages.
Office Action dated Sep. 2, 2021 issued in Chinese Application No. 201780091943.1, 14 pages.
Office Action dated Aug. 5, 2020 issued in U.S. Appl. No. 16/621,598, filed Dec. 11, 2019, 19 pages.
Office Action dated Apr. 5, 2021 issued in Japanese Application No. 2019569680, 6 pages.
Office Action dated Feb. 4, 2021 issued in Japanese Application No. 2019569681, 7 pages.
Office Action dated Jan. 19, 2022 issued in Chinese Application No. 201780091990.6, 15 pages.
Office Action dated Feb. 11, 2022 issued in European Application No. 17 751 413.0. 5 pages.
Notice of Allowance dated Dec. 3, 2021 issued in Chinese Application No. 201780091943 1 (Chinese version), 5 pages.
Office Action dated Jun. 13, 2022 issued in European Application No. 17 731 837.5. 5 pages.

* cited by examiner

REAR PRE-CRASH SAFETY SYSTEM

FIELD

The present disclosure relates to a rear pre-crash safety system, RPCS, of a subject vehicle, in particular a car.

BACKGROUND

A wide range of conventional technologies has been proposed to ensure the safety of passengers of a vehicle. The focus of passive safety systems has been to design a car body which is adapted to absorb a potentially high energy which is generated by a collision with another object such as a target vehicle approaching the subject vehicle. These kinds of passive safety systems comprise for instance seat belts and airbags. Increasingly, advanced active pre-crash safety systems are used in vehicles. With these active safety systems, other vehicles, obstacles, pedestrians or any other kinds of objects in the vehicle's path and/or vehicle's vicinity can be detected to trigger a reaction of the subject vehicle, in particular to avoid a collision with the other object, in particular a target vehicle approaching the subject vehicle. The rear pre-crash safety system can use a radar signal reflected by another object or a target vehicle approaching the subject vehicle from behind to trigger an activator such as a hazard light warning the driver of the approaching target vehicle. Accordingly, conventional rear pre-crash safety systems can issue warning signals in case another object is approaching the subject vehicle from behind. However, in many scenarios unwanted rear pre-crash system, RPCS, warning signals are issued or generated by the rear pre-crash safety system.

SUMMARY

Accordingly, it is an object of the present disclosure to provide a rear pre-crash safety system and a corresponding method to avoid unwanted RPCS warning signals. The rear pre-crash system, RPCS, can include flashing hazard lights.

This object is achieved according to a first aspect of the present disclosure by a rear pre-crash safety system comprising the features of claim 1.

The present disclosure provides according to the first aspect a rear pre-crash system, RPCS, of a subject vehicle comprising a judgement logic adapted to trigger an RPCS warning signal in response to a detected radar signal reflected by a target vehicle approaching the subject vehicle from behind, wherein said judgement logic is configured to modify the triggering of the RPCS warning signal in detected specific traffic scenarios.

In a possible embodiment of the rear pre-crash safety system according to the first aspect of the present disclosure, a specific traffic scenario is detected on the basis of further measured parameters comprising:
a velocity of the subject vehicle,
a velocity of the target vehicle,
a relative velocity between the subject vehicle and the target vehicle,
an acceleration of the subject vehicle,
an acceleration of the target vehicle,
a relative acceleration between the subject vehicle and the target vehicle,
a current distance between the subject vehicle and the target vehicle and/or
a corridor occupancy of the target vehicle.

In a possible embodiment of the rear pre-crash safety system according to the first aspect of the present disclosure, if the current distance of the target vehicle is smaller than a current distance threshold ($D<D_{TH}$) and the relative velocity between the subject vehicle and the target vehicle ($V_R$) is smaller than a predetermined velocity threshold value ($V_R<V_{RTH}$) and if the acceleration of the target vehicle is smaller than a threshold acceleration ($a_{TV}<a_{TH}$), the judgement logic of the rear pre-crash safety system is adapted to suppress an RPCS warning signal.

In a further possible embodiment of the rear pre-crash safety system according to the first aspect of the present disclosure, the judgement logic of the rear pre-crash safety system is configured to compute a time to collision, TTC, for the target vehicle to collide with the subject vehicle.

In a still further possible embodiment of the rear pre-crash safety system according to the first aspect of the present disclosure, the judgement logic of the rear pre-crash safety system is configured to compute the time to collision, TTC, in a first mode if the velocity of the subject vehicle is smaller or equal to zero ($V_{SV} \leq 0$) depending on the relative velocity ($V_R$), the relative acceleration ($a_R$) and the current distance (D) and is further configured to compute the time to collision, TTC, in a second mode if the velocity of the subject vehicle is higher than zero ($V_{SV}>0$) only depending on the relative velocity ($V_R$) and the current distance (D) between the subject vehicle and the target vehicle.

In a further possible embodiment of the rear pre-crash safety system according to the first aspect of the present disclosure, at least one radar sensor device connected to said judgement logic is provided at a rear bumper of the subject vehicle and adapted to detect a radar signal reflected by a target vehicle approaching the subject vehicle from behind.

In a still further possible embodiment of the rear pre-crash safety system according to the first aspect of the present disclosure, a left radar sensor device connected to the judgement logic is provided at a left side of a rear bumper of the subject vehicle and a right radar sensor device is provided at a right side of a rear bumper of the subject vehicle having overlapping field of views, FOVs, to detect radar signals reflected by a target vehicle approaching the subject vehicle from behind.

In a further possible embodiment of the rear pre-crash safety system according to the first aspect of the present disclosure, the judgement logic of the rear pre-crash safety system is configured to issue an RPCS warning signal if a corridor occupancy of an approaching target vehicle occupying a corridor between corridor lines of a subject lane of the subject vehicle exceeds an adjustable corridor occupancy threshold value.

In a further possible embodiment of the rear pre-crash safety system according to the first aspect of the present disclosure, the corridor occupancy of a target vehicle is monitored by the judgement logic depending on reflected radar signals detected by a left radar sensor device and by a right radar sensor device provided at a rear bumper of the subject vehicle.

In a still further possible embodiment of the rear pre-crash safety system according to the first aspect of the present disclosure, the corridor occupancy threshold value is automatically increased if the monitored corridor occupancy has a considerably high overlap with a lane adjacent to the subject lane of the subject vehicle.

In a still further possible embodiment of the rear pre-crash safety system according to the first aspect of the present disclosure, the judgement logic of the rear pre-crash safety system is configured to suppress the RPCS warning signal if a current acceleration of the target vehicle is less than the previously detected acceleration of the target vehicle ($a_{TVi+1} < a_{TVi}$) and
the velocity of the subject vehicle is less than a threshold velocity ($V_{SV} < V_{TH}$) and if
a current acceleration of the subject vehicle is higher than the previously detected acceleration of the subject vehicle ($a_{SVi+1} > a_{SVi}$)
for a predetermined number, N, of monitoring cycles.

The disclosure further provides according to a further aspect a method for providing an RPCS warning signal by a rear pre-crash safety system of a subject vehicle.

The present disclosure provides according to the second aspect a method for providing an RPCS warning signal by a rear pre-crash system, RPCS, of a subject vehicle, the method comprising the steps of: detecting a radar signal reflected by a target vehicle approaching the subject vehicle from behind by at least one radar sensor device of the subject vehicle; and modifying a triggering of an RPCS warning signal issued by said rear pre-crash safety system of said subject vehicle in detected specific traffic scenarios.

In a possible embodiment of the method according to the second aspect of the present disclosure, a specific traffic scenario is detected automatically on the basis of further measured parameters including: a velocity of the subject vehicle, a velocity of the target vehicle, a relative velocity between the subject vehicle and the target vehicle, an acceleration of the subject vehicle, an acceleration of the target vehicle, a relative acceleration between the subject vehicle and the target vehicle, a current distance between the subject vehicle and the target vehicle and/or a corridor occupancy of the target vehicle.

In a possible embodiment of the method according to the second aspect of the present disclosure, the RPCS warning signal is automatically suppressed, if a current distance between the subject vehicle and the target vehicle is less than a threshold distance ($D < D_{TH}$), the relative velocity between the subject vehicle and the target vehicle is less than a threshold velocity ($V_R < V_{RTH}$) and if the acceleration of the target vehicle is less than an acceleration threshold ($a_{TV} < a_{TH}$).

In a further possible embodiment of the method according to the second aspect of the present disclosure, the RPCS warning signal is automatically suppressed, if a current acceleration of the target vehicle is less than a previously detected acceleration of the target vehicle ($a_{TVi+1} < a_{TVi}$) and a current velocity of the subject vehicle is less than a velocity threshold ($V_{SV} < V_{TH}$) and if a currently detected acceleration of the subject vehicle is higher than a previously detected subject vehicle acceleration ($a_{SVi+1} > a_{SVi}$), for a predetermined number, N, of monitoring cycles.

In a further possible embodiment of the method according to the second aspect of the present disclosure, a time to collision, TTC, for the target vehicle to collide with the subject vehicle is computed.

In a further possible embodiment of the method according to the second aspect of the present disclosure, the time to collision, TTC, is computed in a first mode if the velocity of the subject vehicle is less or equal to zero ($V_{SV} \leq 0$) depending on a relative velocity between the subject vehicle and the target vehicle, depending on a relative acceleration between the subject vehicle and target vehicle and depending on a current distance between the subject vehicle and the target vehicle, wherein the time to collision, TTC, is further calculated in a second mode if the velocity of the subject vehicle is higher than zero ($V_{SV} > 0$) depending on the relative velocity between the subject vehicle and the target vehicle and depending on the current distance between the subject vehicle and the target vehicle.

BRIEF DESCRIPTION OF THE DRAWINGS

In the following, possible embodiments of the different aspects of the present disclosure are described in more detail with reference to the enclosed figures.

DETAILED DESCRIPTION

Figure 1:
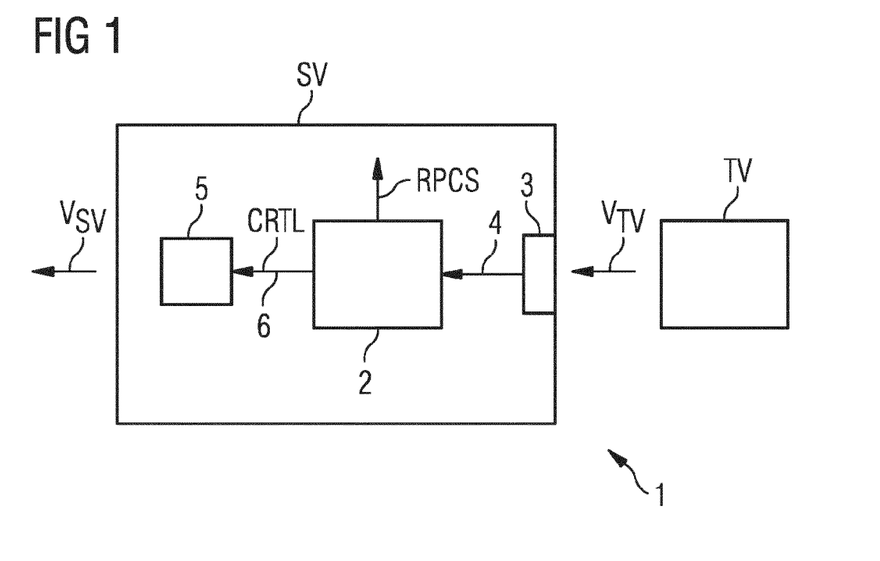
FIG. 1 shows a block diagram of a possible exemplary embodiment of a rear pre-crash safety system of a subject vehicle according to a first aspect of the present disclosure.

As can be seen in FIG. 1, a rear pre-crash safety system 1 according to a first aspect of the present disclosure is implemented in a subject vehicle SV driving with a velocity $V_{SV}$ on a road. The subject vehicle SV can be for instance a car or truck driving on a road with a velocity $V_{SV}$.

The rear pre-crash safety system 1 of the subject vehicle SV comprises in the illustrated embodiment a judgement logic 2. The judgement logic 2 is adapted in the illustrated embodiment to trigger at least one RPCS warning signal in response to a detected radar signal reflected by an object approaching the subject vehicle SV from behind as illustrated in FIG. 1. The object approaching the subject vehicle SV from behind can be a target vehicle TV as shown in FIG. 1. The target vehicle TV can be a car or a truck or any other traffic participant. The target vehicle TV is moving with a velocity $V_{TV}$ as shown in FIG. 1. Further, the subject vehicle SV as well as the target vehicle TV can be accelerated with an acceleration $a_{SV}$, $a_{TV}$, respectively. The judgement logic 2 can trigger an RPCS warning signal in response to a detected radar signal reflected by the target vehicle TV approaching the subject vehicle SV from behind. The judgement logic 2 of the subject vehicle SV is configured in the illustrated embodiment to modify the triggering of the RPCS warning signal in detected specific traffic scenarios.

In the illustrated example of FIG. 1, the approaching target vehicle TV moves with a velocity $V_{TV}$ towards the direction of the preceding subject vehicle SV. The relative velocity $V_R$ between the target vehicle TV and the subject vehicle SV is the difference between the velocity $V_{SV}$ of the subject vehicle SV and the velocity $V_{TV}$ of the target vehicle TV.

In a possible embodiment, the relative velocity $V_R$ of the approaching target vehicle TV can be detected by the judgement logic 2 of the subject vehicle SV on the basis of sensor signals. In a further possible embodiment, the relative velocity $V_R$ between the approaching target vehicle TV and the moving subject vehicle SV can also be derived from the reflected radar signal.

As shown in FIG. 1, the subject vehicle SV comprises in the illustrated embodiment at least one radar sensor device 3 which can be installed in a possible implementation in a rear bumper of the subject vehicle SV. The radar sensor device 3 is adapted to detect a radar signal reflected by the target vehicle TV approaching the subject vehicle SV from behind. The radar sensor device 3 supplies the detected radar signal via a signal line 4 to the judgement logic 2 of the rear pre-crash safety system 1.

In the illustrated embodiment of FIG. 1, the judgement logic 2 of the rear pre-crash safety system 1 can control at least one activator 5 via a control signal line 6. In a possible embodiment, the control logic 2 can trigger automatically a control signal CRTL supplied to the activator 5. The activator 5 can be in a specific embodiment for instance comprise a pre-crash headrest system. The pre-crash headrest system can be used to reduce an injury of a passenger within the subject vehicle SV. The pre-crash headrest system forming an activator 5 can achieve this instantaneously when a rear end collision is judged as unavoidable by the judgement logic 2 by moving the headrest forward towards the head of an occupant before the collision occurs. When the collision judgement logic 2 detects an unavoidable collision, it may transmit a pre-crash headrest activation control signal CRTL to the headrest control unit 5.

As illustrated in FIG. 1, the rear pre-crash safety system 1 is adapted to trigger an RPCS warning signal in detected specific traffic scenarios. These specific traffic scenarios can be detected on the basis of measured parameters. The measured parameters can comprise in a possible embodiment a velocity $V_{SV}$ of the subject vehicle SV and/or a velocity $V_{TV}$ of the target vehicle TV. Further, the detected parameters can also include a relative velocity $V_R$ between the subject vehicle SV and the target vehicle TV. In a further possible embodiment, the further measured parameters evaluated to detect a specific traffic scenario can comprise an acceleration $a_{SV}$ of the subject vehicle SV and/or an acceleration $a_{TV}$ of the target vehicle TV. Further, the measured parameters used for detecting specific traffic scenarios can include a relative acceleration $a_R$ between the subject vehicle SV and the target vehicle TV. In a further possible embodiment, the measured parameters used for detecting a specific traffic scenario can comprise a current distance D between the subject vehicle SV and the target vehicle TV. In a still further possible embodiment, the measured parameters used for detecting a specific traffic scenario can include a corridor occupancy of the target vehicle TV.

Figure 2:
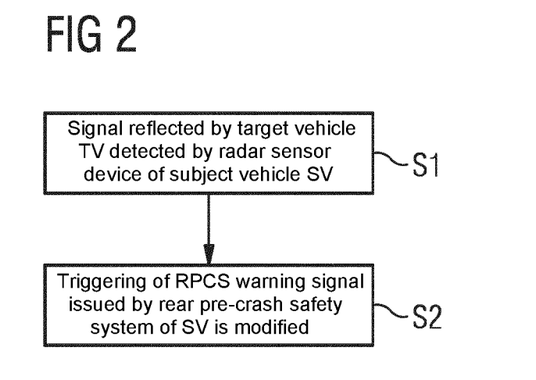
FIG. 2 shows a flowchart of a possible exemplary embodiment of a method for providing an RPCS warning signal according to the second aspect of the present disclosure.

FIG. 2 shows a flowchart of a possible exemplary embodiment of a method for providing an RPCS warning signal by a rear pre-crash safety system 1 of a subject vehicle SV according to an aspect of the present disclosure.

In a first step S1, a radar signal reflected by a target vehicle TV approaching a subject vehicle SV from behind is detected by at least one radar sensor device 3 of the subject vehicle SV.

In a further step S2, the triggering of an RPCS warning signal issued by the rear pre-crash safety system 1 of the subject vehicle SV is modified in detected specific traffic scenarios.

Figure 3:
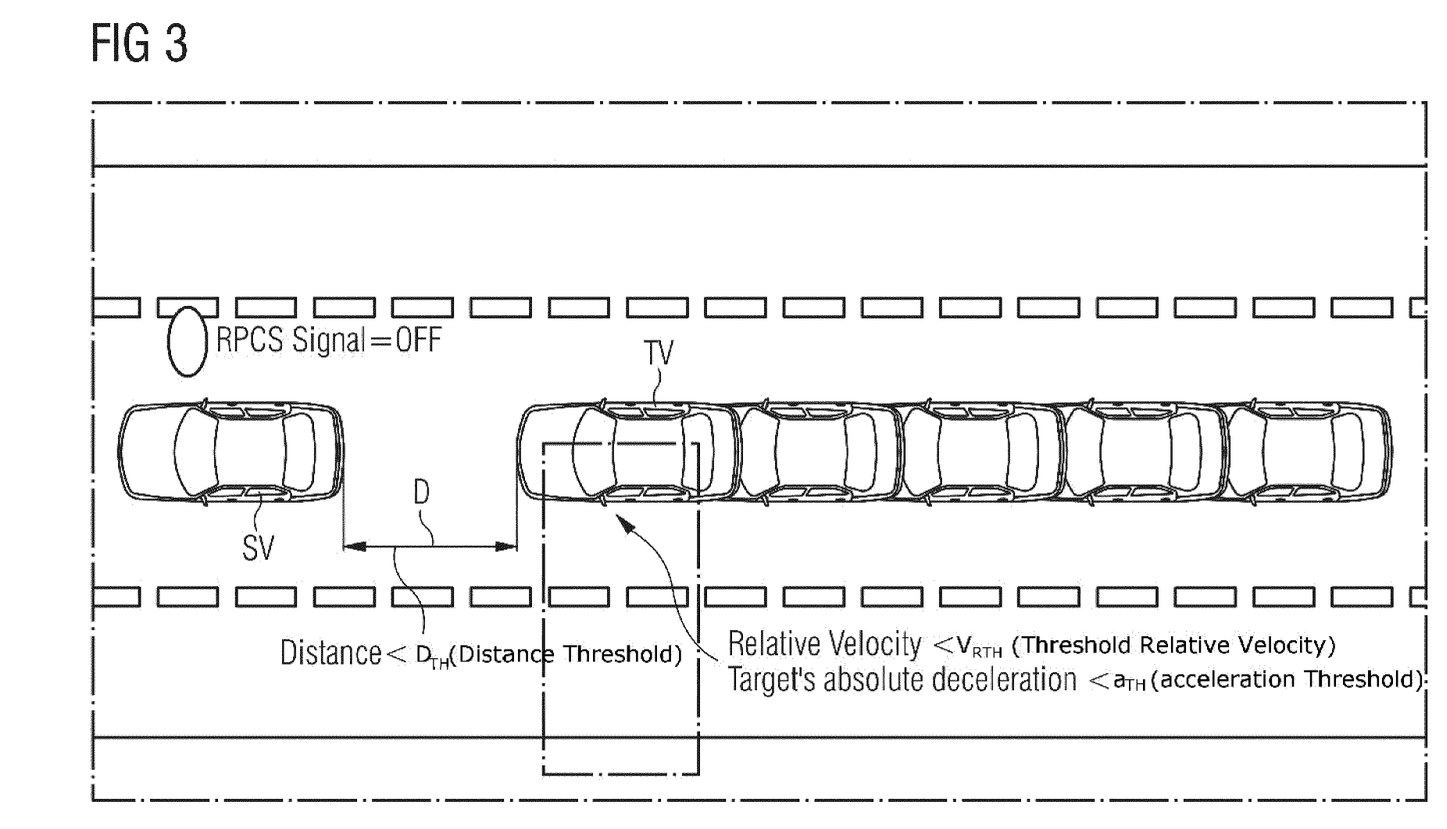
FIG. 3 shows schematically a traffic scenario for illustrating the operation of a method and system for providing an RPCS warning signal according to a possible embodiment of the present disclosure.

FIG. 3 shows schematically a possible traffic scenario for illustrating the operation of a method and system according to the present disclosure. The RPCS rear pre-crash safety system 1 of the subject vehicle SV can judge whether a warning is necessary using a time TTC it takes for a collision to occur between the subject vehicle SV and the target vehicle TV. Target vehicles TV that are very close to a subject vehicle SV which travels at a considerable low speed $V_{SV}$ do not pose a critical threat anymore. Accordingly, when the target vehicle TV reaches a certain current distance D and velocity $V_{TV}$ which are both considerably low and the target vehicle's absolute acceleration $a_{TV}$ is low indicating that the target vehicle TV has already applied a sufficient amount of braking force, then the judgement logic 2 of the rear pre-crash safety system 1 can suppress the RPCS warning signal.

For instance, if the computed vertical current distance D (in the direction of the road lanes) between the subject vehicle SV and the approaching target vehicle TV with respect to the subject vehicle's rear bumper is less than 10 m and the relative velocity $V_R$ of the target vehicle TV with respect to the velocity of the subject vehicle SV is less than 8 m/s, then if the absolute acceleration $a_{TV}$ of the target vehicle TV from that point is less than −1 m/s$^2$, the judgement logic 2 can suppress the RPCS warning signal in this traffic scenario. Accordingly, if the current distance D is less than a distance threshold (D<$D_{TH}$) and if the relative velocity $V_R$ is less than a velocity threshold value $V_{RTH}$ ($V_R$<$V_{RTH}$) and if additionally, the absolute acceleration $a_{TV}$ of the target vehicle TV is less than the absolute acceleration threshold ($a_{TV}$<$a_{TH}$), the judgement logic 2 of the rear pre-crash safety system 1 does suppress the RPCS warning signal since the approaching target vehicle TV does no longer pose a threat to the subject vehicle SV.

Figure 4:
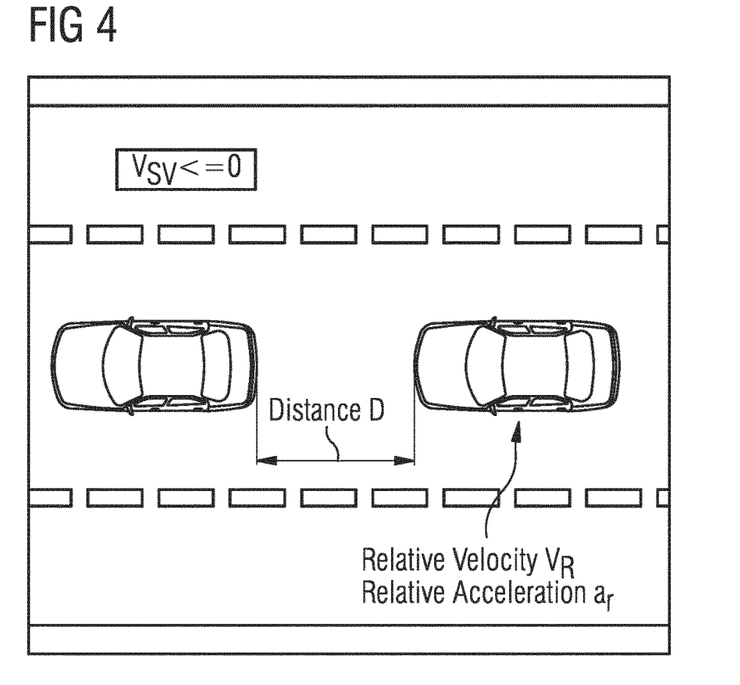
FIGS. 4, 5 illustrate schematically further traffic scenarios for explaining the operation of a method and system according to a possible embodiment of the present disclosure.
Figure 5:
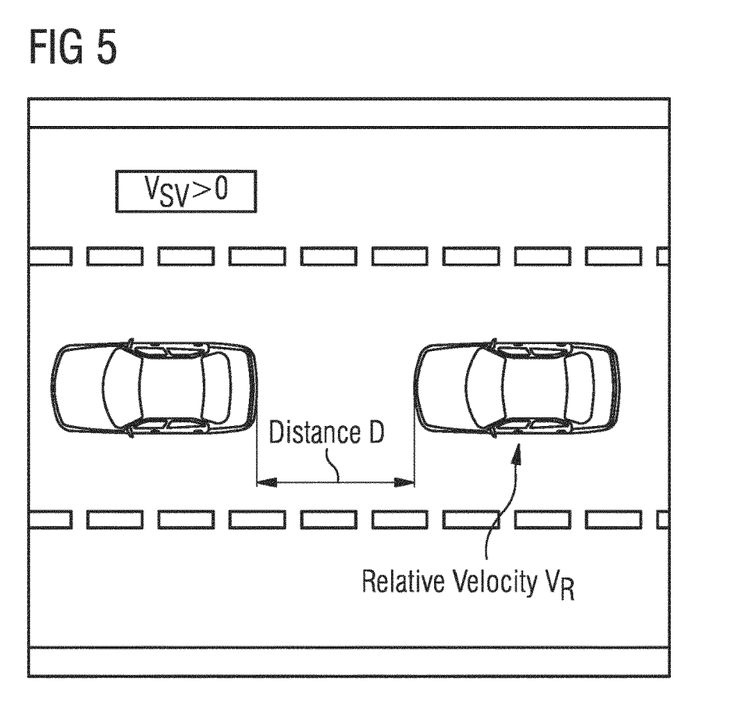

FIGS. 4, 5 show schematically further specific traffic scenarios which are recognized by the judgement logic 2 to suppress an unwanted RPCS warning signal. In a possible embodiment, the judgement logic 2 of the rear pre-crash safety system 1 can compute a time to collision, TTC, of the target vehicle TV to collide with the subject vehicle SV. To compute the time to collision, TTC, it is possible to use a relative acceleration, a current distance and a relative velocity between the subject vehicle SV and the target vehicle TV. However, usage of a relative acceleration $a_R$ when both the subject vehicle SV and target vehicle TV are moving can lead to a wrong value of the time to collision, TTC. Accordingly, in a possible embodiment of the rear pre-crash safety system 1, the TTC can be computed using two different modes.

In a first situation where the subject vehicle SV is in a standstill and is even moving backward ($V_{SV}$≤0), the judgement logic 2 computes the time to collision, TTC, depending on three factors including the relative velocity $V_R$, the relative acceleration $a_R$ and the current distance D between the subject vehicle SV and the target vehicle TV.

$$TTC=TTC(V_R, a_R, D)$$

However, if the subject vehicle SV is moving forward ($V_{SV}$>0), the judgement logic 2 is adapted to compute the time to collision, TTC, using a basic computation and evaluating only the relative velocity $V_R$ and the current distance D between the subject vehicle SV and the target vehicle TV.

$$TTC=TTC(V_R, D)$$

In a possible embodiment, the judgement logic 2 comprises a switching function to switch between the two computation modes. The TTC value is calculated in different modes depending on the detected speed or velocity $V_{SV}$ of the subject vehicle SV. If the subject vehicle speed $V_{SV}$ is less than or equal to 0 m/s ($V_{SV}$≤0), the TTC computation applied by the judgement logic 2 considers the relative acceleration $a_R$ between the subject vehicle SV and the target vehicle TV. However, if the velocity $V_{SV}$ of the subject vehicle SV is greater than 0 m/s ($V_{SV}$>0), the TTC computation performed by the judgement logic 2 comprises a basic computation calculating the TTC only depending on the current distance D and the relative velocity $V_R$ between the subject vehicle SV and the target vehicle TV.

FIG. 4 illustrates a situation where the subject speed or velocity $V_{SV}$ of the subject vehicle SV is less than or equal to zero ($V_{SV}$<0) wherein the TTC is calculated automatically depending on the current distance D between the subject vehicle SV and the target vehicle TV, the relative velocity $V_R$ between the subject vehicle and the target vehicle TV and depending on the relative acceleration $a_R$.

FIG. 5 shows another traffic scenario where the subject vehicle's speed is higher than zero ($V_{SV}$>0), wherein the TTC is calculated by the judgement logic 2 only depending on the current distance D between the subject vehicle SV and the target vehicle TV and depending on the relative velocity $V_R$ between the subject vehicle SV and the target vehicle TV.

Figure 6:
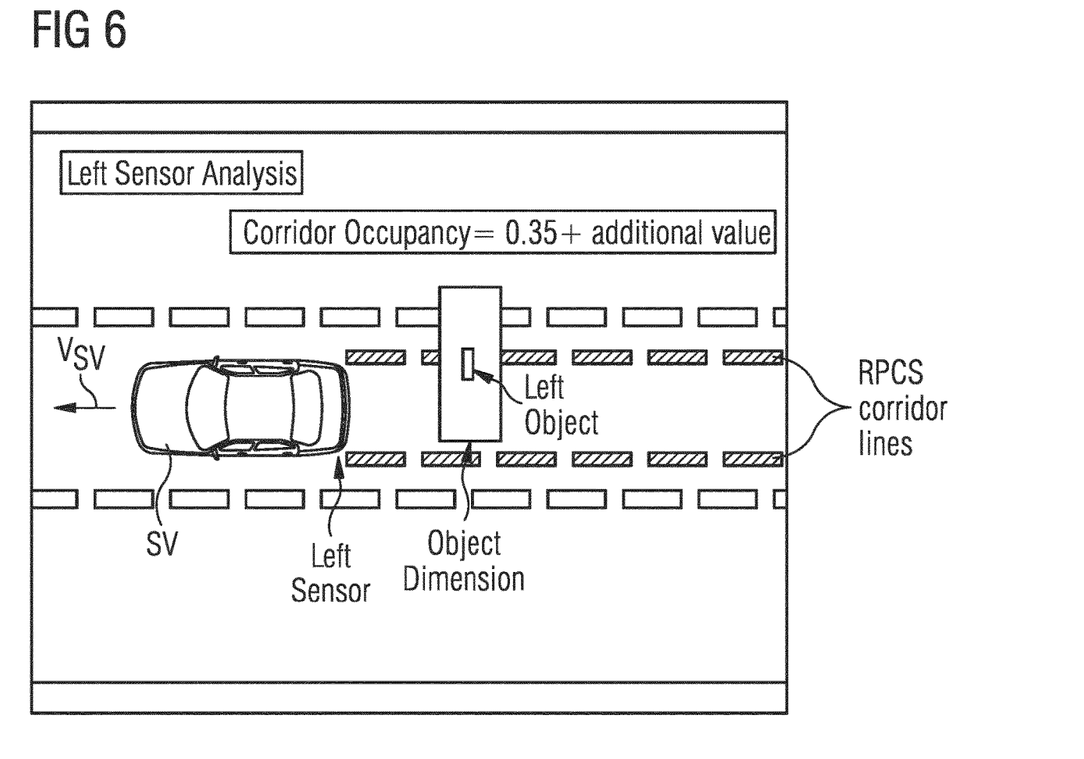
FIG. 6 shows schematically a further exemplary traffic scenario illustrating a possible embodiment of a method and system according to the present disclosure.

FIG. 6 illustrates a further traffic scenario. The subject vehicle SV comprises in a possible embodiment a rear bumper having at least one radar sensor device 3 adapted to detect a radar signal reflected by a target vehicle TV approaching the subject vehicle SV from behind. In an embodiment, a left radar sensor device is provided at a left side of the rear bumper of the subject vehicle SV and a right radar sensor device is provided at a right side of the rear bumper of the subject vehicle SV. The left and right radar sensor devices have overlapping field of views, FoV, to detect radar signals reflected by at least one target vehicle TV approaching the subject vehicle SV from behind. Since the left and right sensor objects are independent to each other, there is a possibility that the sensor's object might overlap or traverse to the opposite sensor's field of view, FOV. Occurrences of this traffic scenario are possible when a wide or broad target vehicle TV does change from a subject lane of the subject vehicle SV to either of the adjacent lanes as illustrated in FIG. 6. Since the left radar sensor device provides sensor signals independent to the values of the right radar sensor device, checking of an RPCS corridor occupancy of the objects can be considered. Objects or target vehicles TV that overlap more to the opposite sensor side must increase a corridor occupancy threshold that must be achieved in order to issue an RPCS warning signal by the judgement logic 2. The judgement logic 2 is configured to issue an RPCS warning signal if a corridor occupancy of an approaching target vehicle TV occupying a corridor between corridor lines of a subject lane of the subject vehicle SV exceeds an adjustable corridor occupancy threshold. For instance, the corridor occupancy threshold can have a value of 0.35 as also illustrated in FIG. 6. Additionally, all RPCS objects can comprise a corridor occupancy threshold of 0.35. However, this initial corridor occupancy threshold value is adjusted dynamically accordingly to analyze sensor objects. The left sensor device objects are analyzed as follows. If the approaching object dimension has a considerably high overlap to the right side RPCS corridor line, the corridor occupancy threshold is automatically increased. The same analysis is performed to right sensor objects. The corridor occupancy of a target vehicle TV can be monitored by the judgement logic 2 depending on reflected radar signals detected by a left radar sensor device and by a right radar sensor device provided at a rear bumper of the subject vehicle SV. The corridor occupancy threshold value is automatically increased if the monitored corridor occupancy has a considerably high overlap with a lane adjacent to the subject lane of the subject vehicle SV as illustrated in FIG. 6.

Figure 7:
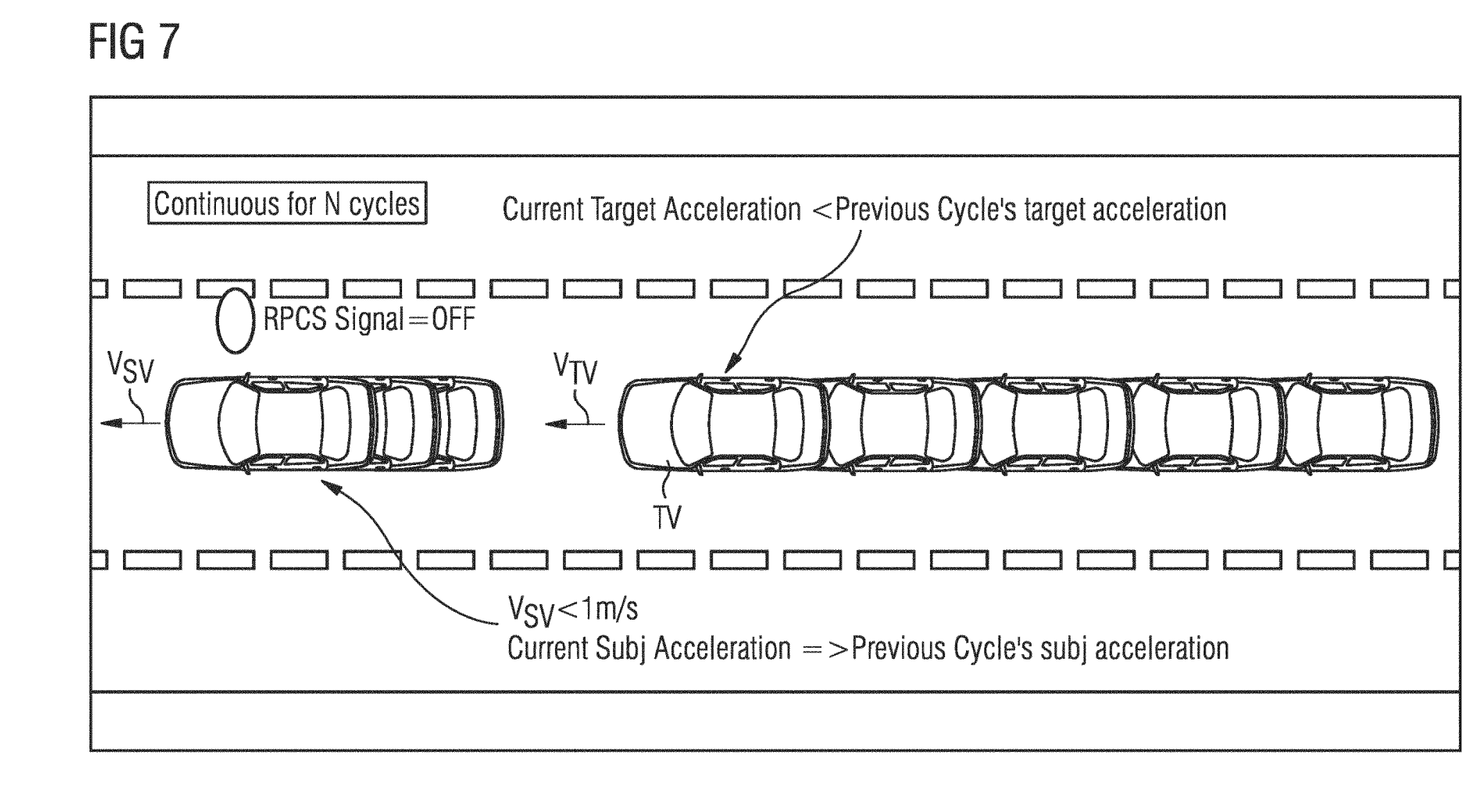
FIG. 7 shows schematically a further exemplary traffic scenario for illustrating the operation of a method and system according to a specific embodiment of the present disclosure.

FIG. 7 shows schematically a further traffic scenario detected by the judgement logic 2 having an impact on the triggering of the RPCS warning signal. When the subject vehicle SV suddenly applies a strong brake, i.e. if the negative acceleration of the subject vehicle SV is increased and if the target vehicle TV simultaneously applies a sufficient amount of braking force to avoid a collision with the subject vehicle SV, then, if the target vehicle TV also changes a lane from the subject lane of the subject vehicle SV to an adjacent lane, this may still trigger an unwanted RPCS warning signal in a conventional system. Accordingly, in an embodiment of the rear pre-crash safety system 1 according to the present disclosure, the judgement logic 2 is configured to suppress the RPCS warning signal in such a traffic situation where a current acceleration of a target vehicle $a_{TVn+1}$ is less than a previously detected acceleration of target vehicle ($a_{TVn+1}$<$a_{TVn}$) and if the subject vehicle speed $V_{SV}$ is less than a predetermined velocity threshold value ($V_{SV}$<$V_{TH}$), and if further, an acceleration of the subject vehicle SV has increased ($a_{SVn+1}$>$a_{SVn}$) and if these three conditions are met continuously for a predetermined number, N, of monitoring cycles. Looking at the properties of the target vehicle TV in this specific traffic scenario as shown in FIG. 7, the continuous decrease of the target vehicle's acceleration, subject vehicle's speed and acceleration provides a unique behavior. In order to suppress an unwanted RPCS warning signal, three conditions are checked by the judgement logic 2 to suppress an RPCS warning signal. The first condition is that the target vehicle acceleration $a_{TV}$ is decreased from the last cycle's value. The second condition is that the subject vehicle's speed $V_{SV}$ is for instance less than 1 m/sec. The third condition is that the subject vehicle's acceleration $a_{SV}$ is increased or remains the same as in the previous monitoring cycle. If these three conditions are met continuously, the judgement logic 2 automatically does suppress an RPCS warning signal.

Further embodiments of the rear pre-crash safety system 1 according to the present disclosure are possible. For instance, in a possible embodiment, if a radar cross section RCS of the approaching target vehicle TV and/or the relative velocity $V_R$ of the approaching target vehicle TV are below configurable threshold values, the RPCS warning signal can be suppressed by this judgement logic 2. As in a stop-and-go traffic situation, the radar cross section RCS of a following target vehicle TV following the subject vehicle SV from behind can be kept in a standstill condition and can be refreshed whenever a velocity of the following target vehicle TV relative to the subject vehicle SV is detected. In such a stop-and-go traffic situation or scenario, the RPCS warning signal can be suppressed by the judgement logic 2 in response to a detected radar signal reflected by a further target object besides the following target object approaching the vehicle from behind. In a still further possible embodiment, an object or a target vehicle TV approaching the subject vehicle SV from behind can be classified by the judgement logic 2 depending on a radar cross section RCS of the approaching target vehicle TV and/or a relative velocity of the approaching target vehicle TV. In a possible embodiment, the approaching target vehicle TV can comprise a traffic participant including a truck, a car, a motorbike, a bicycle and/or a pedestrian.

The invention claimed is:
1. A rear pre-crash system (RPCS) of a subject vehicle comprising a judgement logic adapted to trigger an RPCS warning signal in response to a detected radar signal reflected by a target vehicle approaching the subject vehicle from behind, wherein said judgement logic comprises circuitry configured to:

receive the detected radar signal via a signal line, to control at least one warning light activator via a control signal line based on the RPCS warning signal, and modify the triggering of the RPCS warning signal in detected specific traffic scenarios, wherein the judgement logic is adapted to suppress the RPCS warning signal where a current distance between the subject vehicle and the target vehicle is smaller than a threshold distance ($D<D_{TH}$) and a relative velocity between the subject vehicle and the target vehicle is smaller than a threshold relative velocity ($V_R<V_{RTH}$) and an absolute acceleration of the target vehicle is smaller than a threshold acceleration ($a_{TV}<a_{TH}$).

2. The rear pre-crash system according to claim 1 wherein a specific traffic scenario is detected based on one or more of the following measured parameters:

a velocity of the subject vehicle,
a velocity of the target vehicle,
the relative velocity between the subject vehicle and the target vehicle,
an absolute acceleration of the subject vehicle,
the absolute acceleration of the target vehicle,
a relative acceleration between the subject vehicle and the target vehicle,
the current distance between the subject vehicle and the target vehicle,
a corridor occupancy of the target vehicle, wherein the corridor occupancy measures an extent to which the target vehicle occupies a corridor between corridor lines of a subject lane of the subject vehicle.

3. The rear pre-crash system according to claim 1 wherein the judgement logic is configured to compute a time to collision for the target vehicle to collide with the subject vehicle.

4. The rear pre-crash system according to claim 3 wherein the judgement logic is configured to compute the time to collision in a first mode when a velocity of the subject vehicle is less than or equal to zero ($V_{SV} \leq 0$) depending on the relative velocity between the subject vehicle and the target vehicle, a relative acceleration between the subject vehicle and the target vehicle and the current distance between the subject vehicle and the target vehicle, and wherein the judgement logic is further configured to compute the time to collision in a second mode when the velocity of the subject vehicle is more than zero ($V_{SV}>0$) depending on the relative velocity between the subject vehicle and the target vehicle and depending on the current distance between the subject vehicle and the target vehicle.

5. The rear pre-crash system according to claim 1 wherein said judgement logic is connected to at least one radar sensor device at a rear bumper of the subject vehicle and adapted to detect a radar signal reflected by the target vehicle approaching the subject vehicle from behind.

6. The rear pre-crash system according to claim 5 wherein said judgement logic is connected to a left radar sensor device at a left side of the rear bumper of the subject vehicle and a right radar sensor device at a right side of the rear bumper of the subject vehicle having overlapping field of views to detect radar signals reflected by the target vehicle approaching the subject vehicle from behind.

7. The rear pre-crash system according to claim 1 wherein the judgement logic is configured to issue a RPCS warning signal when a corridor occupancy of the approaching target vehicle occupying a corridor between corridor lines of a subject lane of the subject vehicle exceeds an adjustable corridor occupancy threshold value, wherein the corridor occupancy measures an extent to which the target vehicle occupies the corridor between the corridor lines of the subject lane of the subject vehicle.

8. The rear pre-crash system according to claim 7 wherein the corridor occupancy of the target vehicle is monitored by said judgement logic depending on reflected radar signals detected by a left radar sensor device and by a right radar sensor device provided at a rear bumper of the subject vehicle.

9. The rear pre-crash system according to claim 7 wherein the corridor occupancy threshold value is automatically increased when the measured corridor occupancy has overlap with a lane adjacent to the subject lane of the subject vehicle.

10. The rear pre-crash system according to claim 1 wherein the judgement logic is configured to suppress the RPCS warning signal when the absolute acceleration of the target vehicle has decreased from a previous monitoring cycle's value ($a_{TVn+1}<a_{TVn}$) and if the when a velocity of the subject vehicle is less than a threshold velocity ($V_{SV}<V_{TH}$) and an absolute acceleration of the subject vehicle has increased or remains the same as in the previous monitoring cycle ($a_{SVn+1}>a_{SVn}$)

for a predetermined number of monitoring cycles.

11. A method for providing an RPCS warning signal by a rear pre-crash system (RPCS) of a subject vehicle, the method comprising:

(a) detecting a radar signal reflected by a target vehicle approaching the subject vehicle from behind by at least one radar sensor device of the subject vehicle;

(b) controlling at least one warning light activator via a control signal line based on the RPCS warning signal; and (c) modifying triggering of the RPCS warning signal issued by said RPCS of said subject vehicle in detected specific traffic scenarios, wherein the RPCS warning signal is automatically suppressed, when a current distance between the subject vehicle and the target vehicle is less than a threshold distance ($D<D_{TH}$), a relative velocity between the subject vehicle and the target vehicle is less than a relative threshold velocity ($V_R<V_{RTH}$) and when an absolute acceleration of the target vehicle is less than a threshold acceleration ($a_{TV}<a_{TH}$) for a predetermined number of monitoring cycles.

12. The method according to claim 11 wherein a specific traffic scenario is detected based on one or more of the following measured parameters:

a velocity of the subject vehicle,
a velocity of the target vehicle,
the relative velocity between the subject vehicle and the target vehicle,
an absolute acceleration of the subject vehicle,
the absolute acceleration of the target vehicle,
a relative acceleration between the subject vehicle and the target vehicle,
the current distance between the subject vehicle and the target vehicle, a corridor occupancy of the target vehicle, wherein the corridor occupancy measures an extent to which the target vehicle occupies a corridor between corridor lines of a subject lane of the subject vehicle.

13. The method according to claim 11 wherein a time to collision for the target vehicle to collide with the subject vehicle is computed in a first mode when a velocity of the subject vehicle is equal to or less than zero ($V_{SV} \leq 0$) depending on the relative velocity between the subject vehicle and the target vehicle, and a relative acceleration between the subject vehicle and the target vehicle and depending on the current distance between the subject vehicle and the target vehicle, and wherein the time to collision is calculated in a second mode when the velocity of the subject vehicle is higher than zero ($V_{SV} > 0$) depending on the relative velocity between the subject vehicle and the target vehicle, and the current distance between the subject vehicle and the target vehicle.

14. The method according to claim 11 wherein the RPCS warning signal is automatically suppressed when the absolute acceleration of the target vehicle in a current monitoring cycle is less than the absolute acceleration of the target vehicle in a previous monitoring cycle ($a_{TVi+1} < a_{TVi}$) and a velocity of the subject vehicle is less than a threshold velocity ($V_{SV} < V_{TH}$) and an absolute acceleration of the subject vehicle in the current monitoring cycle is higher than the absolute acceleration of the subject vehicle in the previous monitoring cycle ($a_{SVi+1} > a_{SVi}$) for the predetermined number of monitoring cycles.

* * * * *